United States Patent Office 3,432,502
Patented Mar. 11, 1969

3,432,502
PREPARATION OF PYRAZINOYLGUANIDINE
AND PYRAZINAMIDOGUANIDINE PRODUCTS
Peter I. Pollak, Scotch Plains, and Roger J. Tull,
Metuchen, N.J., assignors to Merck & Co., Inc.,
Rahway, N.J., a corporation of New Jersey
No Drawing. Filed Aug. 25, 1966, Ser. No. 574,909
U.S. Cl. 260—250
Int. Cl. *C07d 51/66, 51/76;* A61k 27/00
5 Claims

ABSTRACT OF THE DISCLOSURE

The preparation of a (3,5-diamino-6-halopyrazinoyl) guanidine or a (3,5-diamino-6-halopyrazinamido)guanidine by the reaction of a 3,5-diamino-6-halopyrazinoic acid hydrazide with a guanidine or an aminoguanidine is described. The end products possess diuretic and saluretic properties but do not enhance potassium excretion.

---

This invention is concerned with a novel process for the preparation of (3,5-diamino-6-halopyrazinoyl)guanidine and (3,5-diamino - 6 - halopyrazinamido)guanidine compounds which possess useful diuretic properties but more importantly they selectively enhance the excretion of sodium and chloride ions while suppressing the excretion of potassium. The products prepared by the novel process of this invention are especially useful in the treatment or management of edema and other abnormalities resulting from the retention of excess quantities of sodium and fluid by the animal organism.

Acylguanidines and acylaminoguanidines have been prepared by the reaction of alkyl esters of organic acids with guanidine or aminoguanidine, and also by the reaction of organic acid hydrazides with 2-methyl-2-thiopseudourea. Both of these methods often result in low yields and considerable quantities of cyclized by-products may be produced. Starting with some heterocyclic acid hydrazides, only the cyclized products are produced, or can be recovered as products of the reaction. In addition, these prior art methods utilized relatively expensive reactants.

The novel process of this invention involves the reaction of a 3,5-diamino-6-halopyrazinoic acid hydrazide with guanidine in the presence of chloral or bromal (that is trichloroacetaldehyde or tribromoacetaldehyde). This novel process presents a simple and highly economical method of producing an important group of diuretic or natriuretic products.

The reaction advantageously is carried out in the presence of a water miscible solvent such as an alcohol, dimethylformamide, dimethyl sulfoxide, and the like. While the reaction will take place at room temperature, heating to the boiling point of the solvent can be employed to bring the reaction to completion more readily.

While the novel method of this invention can be employed to produce substantially any (3,5-diamino-6-halopyrazinoyl)guanidine or (3,5-diamino - 6 - halopyrazinamido)guanidine product, the reaction is particularly useful in the preparation of products having the following structural formula:

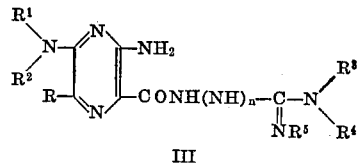

III and acid addition salts thereof wherein R is halogen, particularly chloro or bromo; $R^1$ and $R^2$ can be the same or dissimilar groups selected from hydrogen, lower alkyl advantageously having from 1 to 5 carbon atoms as methyl, ethyl, propyl, isopropyl, butyl, amyl, or any of the branched 4 or 5 carbon alkyl groups, lower alkenyl advantageously having from 3 to 5 carbon atoms and particularly the allyl, propargyl or 3-pentenyl and the like, or a lower(cycloalkyl-alkyl) group advantageously having from 4 to 8 carbons in the group such as the cyclopropylmethyl, cyclopentylmethyl, cyclohexylmethyl, cyclohexylethyl, cyclopropylethyl and the like; $R^3$ represents hydrogen, a lower alkyl advantageously having from 1 to 5 carbon atoms, such as methyl, ethyl, propyl, isopropyl, butyl, amyl, or any of the branched 4 or 5 carbon lower alkyl groups, or substituted lower alkyl groups having from 1 to 5 carbon atoms and particularly those containing hydroxy or a heterocyclic substituent such as the pyridyl substituent or a phenyl substituent, the phenyl lower alkyl advantageously having an alkyl moiety of 1 to 2 carbon atoms and the phenyl moiety being either unsubstituted or substituted with one or more halogen (preferably chlorine, bromine, fluorine), lower alkyl (having 1 to 2 carbon atoms) and lower alkoxy (having 1 to 2 carbon atoms) groups; $R^4$ advantageously is hydrogen, lower alkyl having 1 to 5 carbon atoms such as methyl, ethyl, propyl, isopropyl, butyl, amyl or any of the branched 4 or 5 carbon alkyl groups, phenyl-lower alkyl wherein the alkyl moiety advantageously has from 1 to 2 carbon atoms and the phenyl moiety being either substituted or having one or more substituents selected preferably from halogen (advantageously chlorine, bromine, fluorine), lower alkyl (advantageously having from 1 to 2 carbon atoms) and lower alkoxy (having 1 to 2 carbon atoms) groups; when $R^3$ and $R^4$ are each lower alkyl they can be linked together to form a cyclic structure with the nitrogen atom to which they are attached, thereby forming a group having the structure

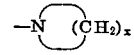

wherein $x$ preferably is one of the numerals from 4 through 7, thus yielding, for example, the 1-pyrrolidinyl group; $R^5$ advantageously is hydrogen or lower alkyl having from 1 to 5 carbon atoms such as methyl, ethyl, propyl, isopropyl, butyl, amyl or any of the branched 4 or 5 carbon alkyl groups; and when $R^5$ and $R^4$ each are lower alkyl, they can be linked together to form the structure

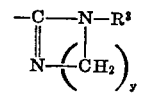

wherein $y$ preferably is one of the numerals 2 or 3; and $n$ is either 0 or 1.

The novel process of this invention can be illustrated by the following reaction scheme wherein the variable radicals have the meaning assigned to each of them above.

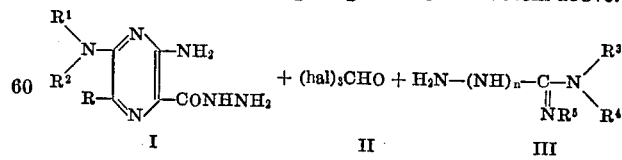

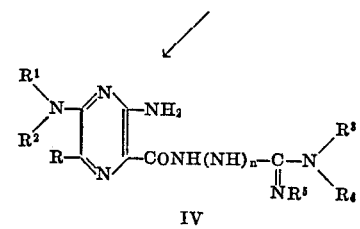

IV

The reactants I, II, and III are either readily available compounds or can be prepared by methods described in the literature. The free base of the guanidine reactant is preferred in carrying out the reaction and advantageously can be prepared in situ from a salt of the guanidine or amino-guanidine by known methods. The acid addition salts of the desired end product, IV, can be prepared by any conventional method such as by removing the end product from the reaction mixture and recrystallizing it from a dilute solution of the particular acid desired to form the acid addition salt.

The following examples illustrate the novel method of this invention.

Example 1.—(3,5-diamino-6-chloropyrazinoyl) guanidine hydrochloride

One mole of 6-chloro-3,5-diaminopyrazinoic acid hydrazide and 3 moles of chloral are heated at 80° C. for two hours in 300 ml. of dimethoxyethane. The solution then is cooled to room temperature and one mole of guanidine is added with stirring. The reaction mixture is heated again at 80° C. for an additional two hours whereupon most of the solvent is removed by distillation and the product, (6-chloro-3,5-diaminopyrazinoyl)guanidine, is precipitated by addition of 300 ml. of 1 N hydrochloric acid to give the product in the form of its hydrochloride salt, melting point 293.5° C. (dec.).

Example 2.—(3.5-diamino-6-bromopyrazinoyl) guanidine

A mixture of one mole of 6-bromo-3,5-diaminopyrazinoic acid hydrazide and 3 moles of bromal in 300 ml. of diglyme is refluxed for two hours. The solution is cooled to room temperature and one mole of guanidine is added with stirring. The mixture is heated again to reflux and reflux continued for an additional two hours whereupon the solvent is removed by distillation to give (6-bromo-3,5-diaminopyrazinoyl)guanidine, M.P. 232.5–235.5° C. (dec.).

The following table identifies other products that can be prepared by the process of this invention. The method employed for preparing these compounds comprises heating a mixture of the pyrazinoic acid hydrazide reactant (I) with chloral or bromal, cooling the reaction mixture and adding from about 1–10 equivalents (preferably 1–3 equivalents) of the guanidine reactant (III). The temperature is again raised to between 60–100° C. or to reflux temperature and heating is continued for approximately another two to three hours. The solvent is removed and the end product recovered either as the free base or as the hydrochloride salt.

TABLE I

| R | $R^1$ | $R^2$ | $R^3$ | $R^4$ | $R^5$ | M.P. °C. (d) of End Product [1] |
|---|---|---|---|---|---|---|
| Cl | H | H | $CH_3$ | H | H | 252–254. |
| Cl | H | H | $CH_3$ | $CH_3$ | H | HCl monohydrate 277. |
| Cl | H | H | $C_2H_5$ | $C_2H_5$ | H | 265. |
| Cl | H | H | $CH_2$—C₆H₅ | H | H | HCl 274.5. |
| Cl | H | H | —$CH_2CH_2OH$ | H | H | HCl 228.5–229.5. |
| Cl | H | H | —$CH_2$—C₆H₅ | H | H | 215–216. |
| Cl | H | H | —$CH_2$—C₆H₄—Cl | H | H | 220–223. |
| Cl | H | H | —$CH_2$—C₆H₄—F | H | H | 216–219.5. |
| Cl | H | H | —$CH_2$—C₆H₄—$CH_3$ | H | H | 210–122. |
| Cl | H | H | —$CH_2$—C₆H₄—$OCH_3$ | H | H | 175.5–179.5. |
| Cl | H | H | —$CH_2$—C₆H₃($CH_3$)—$CH_3$ | H | H | 220–222. |
| Cl | H | H | —CH($CH_3$)—C₆H₅ | H | H | 152–160. |
| Cl | H | H | —$CH_2CH_2$—C₆H₅ | H | H | 219–221.5. |
| Cl | H | H | —$CH_2$—pyridyl | H | H | 2 HCl 280.5–283.5. |
| Cl | H | H | | $CH_2CH_2$ | | 222.5–223.5. |
| Cl | H | —iPr | $CH_3$ | H | H | >300. |
| Cl | H | —iPr | $CH_3$ | $CH_3$ | H | 238.5–240. |
| Cl | H | —iPr | —$CH_2CH_2OH$ | H | H | HCl·hemihydrate 185–186. |

See footnote at end of table.

TABLE I—Continued

| R | R¹ | R² | R³ | R⁴ | R⁵ | M.P. °C. (d) of End Product [1] |
|---|----|----|----|----|----|---------------------------------|
| Cl | H | -iPr | CH₂-⟨phenyl⟩ | H | H | 200.5-204.5 |
| Cl | H | -CH₂CH=CH₂ | H | H | H | 213-214 |
| Cl | H | -CH₂CH=CH₂ | CH₃ | CH₃ | H | 213-215 |
| Cl | H | nBu | CH₃ | CH₃ | H | 187.5 |
| Cl | H | CH₂-⟨cyclopropyl⟩ | H | H | H | 220-221.5 |
| Cl | CH₃ | CH₃ | H | H | H | 216-217 |
| Cl | CH₃ | C₂H₅ | H | H | H | 229-230 |
| Cl | CH₃ | nPr | H | H | H | 214-215 |
| Cl | CH₃ | -iPr | H | H | H | 207-208 |
| Cl | CH₃ | -iPr | CH₃ | CH₃ | H | 209-211 |
| Cl | Et | Et | CH₃ | CH₃ | H | 212-214 |

[1] As free base unless otherwise noted.

Example 3.—(3,5-diamino-6-chloropyrazinamido) guanidine

A mixture of 1 mole of 6-chloro-3,5-diaminopyrazinoic acid hydrazide and 3 moles of chloral in 300 ml. of ethanol is heated at reflux for two hours. The reaction mixture is cooled to room temperature and 3 moles of aminoguanidine are added with stirring. The reaction mixture is heated to reflux and refluxing continued for an additional two hours whereupon the solvent is removed by distillation to give (3,5-diamino-6-chloropyrazinamido)guanidine. The product is recrystallized from dilute hydrochloric acid to give (3,5-diamino-6-chloropyrazinamido) guanidine hydrochloride, melting point 281-282° C. (dec.).

Example 4.—(3-amino-5-dimethylamino-6-chloropyrazinamido)guanidine

By replacing the pyrazinoic acid hydrazide employed in Example 3 by an equimolecular quantity of 3-amino-5-dimethylamino-6-pyrazinoic acid hydrazide and then following substantially the same procedure described in Example 3 there is obtained (3-amino-5-dimethylamino-6-chloropyrazinamido)guanidine which, in the form of the free base, melts at 221° C. (dec.).

Example 5.—(3,5-diamino-6-chloropyrazinamido)-2,3-ethyleneguanidine

By replacing aminoguanidine used in Example 3 by an equimolecular quantity of 1-amino-2,3-ethyleneguanidine and then following substantially the same procedure described in Example 3, except the reaction is carried out at room temperature, there is obtained (3,5-diamino-6-chloropyrazinamido) - 2,3 - ethyleneguanidine, M.P. 249-251° C.

Example 6.—(3,5-diamino-6-chloropyrazinamido) guanidine hydrochloride

The above product is prepared following substantially the same procedure described in Example 3 except the aminoguanidine reactant employed in Example 3 is replaced by an equimolecular quantity of 1-amino-3,3-dimethylguanidine. The product obtained in the form of its hydrochloride salt melts at 279-280° C. (dec.).

By replacing the pyrazinoic acid hydrazide employed in Example 3 by any of the pyrazinoic acid hydrazides identified in Table I and then following substantially the same procedure described in Example 3, there is obtained the corresponding (3-amino-5-(NR¹R²) - 6 - chloropyrazinamido)guanidine product.

Similarly by replacing the guanidine reactant employed in Example 2 by an equimolecular quantity of aminoguanidine and then following the same procedure described in Example 2, there is obtained (3,5-diamino-6-bromopyrazinamido)guanidine.

In like manner, by replacing the aminoguanidine employed in Example 3 by an equimolecular quantity of:

1-amino-3-methylguanidine,
1-amino-3-(2-hydroxyethyl)guanidine,
1-amino-3-phenethylguanidine,
1-amino-3-benzylguanidine, and
1-amino-2,3,3-trimethylguanidine and then following substantially the same procedure described in Example 3, there is obtained respectively, 1-(3,5-diamino-6-chloropyrazinamido)-3-methylguanidine,
1-(3,5-diamino-6-chloropyrazinamido)-3-(2-hydroxyethyl)guanidine,
1-(3,5-diamino-6-chloropyrazinamido)-3-phenethylguanidine,
1-(3,5-diamino-6-chloropyrazinamido)-3-benzylguanidine, and
1-(3,5-diamino-6-chloropyrazinamido)2,3,3-trimethylguanidine.

What is claimed is:

1. A process comprising the reaction of a 3,5-diamino-6-halopyrazinoic acid hydrazide of structure I and a guanidine or an aminoguanidine of structure II in the presence of chloral or bromal to form a product of structure III

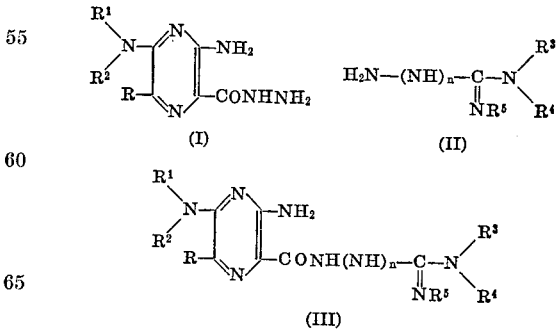

wherein R is selected from the group consisting of chlorine and bromine, R¹ is selected from the group consisting of hydrogen, lower alkyl, lower alkenyl and lower-(cycloalkylalkyl); R² is selected from the group consisting of hydrogen, lower alkyl, lower alkenyl, and lower-(cycloalkyl-alkyl); R³ is selected from the group consisting of hydrogen, lower alkyl, hydroxy-lower alkyl, phenyl-lower alkyl, (halophenyl)-lower alkyl, (lower alkyl-phenyl)-lower alkyl, (lower alkoxyl-phenyl)-lower alkyl, and pyridyl-lower alkyl; $R^4$ is selected from the group consisting of hydrogen, lower alkyl, and phenyl-lower alkyl; $R^5$ is selected from the group consisting of hydrogen and lower alkyl; and when $R^4$ and $R^5$ each are lower alkyl, they can be linked together to form a cyclic structure with the nitrogen atoms to which they are attached; and $n$ is a numeral selected from 0 and 1.

2. A process as claimed in claim 1 wherein the reaction is carried out in the presence of a water-miscible solvent selected from a lower alkanol, dimethylformamide, dimethyl sulfoxide, dimethoxy ethane and diglyme.

3. A process as claimed in claim 1 wherein 3,5-diamino-6-chloropyrazinoic acid hydrazide is reacted with guanidine to give (3,5-diamino-6-chloropyrazinoyl)guanidine.

4. A process as claimed in claim 1 wherein 3,5-diamino-6-chloropyrazinoic acid hydrazide is reacted with aminoguanidine to give (3,5-diamino-6-chloropyrazinamido)guanidine.

5. A process as claimed in claim 2 wherein the reaction is carried out at a temperature ranging between room temperature and reflux temperature of the solvent.

References Cited

Kametani et al., Chem. Pharm. Bull. (Tokyo), 14 (4), 369–75, April 1966.

ALEX MAZEL, *Primary Examiner.*

R. V. RUSH, *Assistant Examiner.*

U.S. Cl. X.R.

260—999